United States Patent [19]

Haferl

[11] Patent Number: 4,782,269
[45] Date of Patent: Nov. 1, 1988

[54] SAWTOOTH GENERATOR WITH S-CORRECTION

[75] Inventor: Peter E. Haferl, Adliswil, Switzerland

[73] Assignee: RCA Licensing Corporation, Princeton, N.J.

[21] Appl. No.: 111,334

[22] Filed: Oct. 22, 1987

[30] Foreign Application Priority Data

Dec. 24, 1986 [GB] United Kingdom ............... 8630921

[51] Int. Cl.$^4$ .................. H01J 29/56; H01J 29/70; H04N 5/04
[52] U.S. Cl. .................................. 315/371; 315/387; 358/152
[58] Field of Search ................. 315/370, 371, 387; 358/152, 242

[56] References Cited

U.S. PATENT DOCUMENTS

| | | | |
|---|---|---|---|
| 2,681,383 | 6/1954 | Loe . | |
| 3,678,332 | 7/1972 | Boekhorst . | |
| 3,842,311 | 10/1974 | Knox | 315/388 |
| 3,863,106 | 1/1975 | Haferl | 315/388 |
| 4,188,567 | 2/1980 | Monroe | 315/396 |

OTHER PUBLICATIONS

A Portion of a Schematic Diagram of a Blaupunkt 100-30 Color Television Chassis Dated Jun., 1985 and an Accompanying Sheet that Includes Corresponding Waveforms, U.S. patent application No. 943,044 entitled, Television Apparatus for Generating a Phase Modulated Deflection Current in the Name of Willem den Hollander.

Primary Examiner—Theodore M. Blum
Assistant Examiner—Gregory C. Issing
Attorney, Agent, or Firm—Eugene M. Whitacre; Joseph J. Laks; Sammy S. Henig

[57] ABSTRACT

In a vertical sawtooth generator, first and second capacitors are coupled in series to a first terminal of a switch. When the switch is conductive, the two capacitors are discharged by the switch to form a sawtooth signal at the first terminal having a down-ramping portion that corresponds with a retrace interval. When the switch is nonconductive, the two capacitors are charged by a source of current to form an upramping portion of the sawtooth signal that corresponds with a trace interval. An S-shaping arrangement that is coupled to a junction terminal of the two capacitors includes a third capacitor two resistors and a clamping arrangement that provide S-shaping of the sawtooth signal at both ends of the trace interval and dc restoring prior to the beginning of each trace interval.

34 Claims, 5 Drawing Sheets

SAWTOOTH GENERATOR WITH S-CORRECTION

This invention relates to a sawtooth generator that pruduces S-corrected signal for a television deflection system. In particular, it relates to such generator that may be used in, for example, a deflection system, arranged for reducing the visibility of flicker.

The threshold of perception of field flicker in a television display system is a function of the flicker frequency and the brightness of the display. Over the years displays have increased in brightness to the point where flicker is noticeable even in relatively high field rate systems (e.g., the NTSC 60 Hz system) and clearly objectionable in lower field rate systems (e.g., the PAL 50 Hz system). A solution to this problem is to double the field rate of displayed images. In one prior art system, a video input signal is stored in a field memory. Each stored field is recovered or "read" twice from the memory and displayed on a display scanned at double the line rate and double the field rate of the incoming video signal thereby doubling the flicker frequency of displayed images and thus reducing the visibility of flicker.

In a copending U.S. Pat. application No. 857,375 entitled TELEVISION DISPLAY SYSTEM WITH FLICKER REDUCTION PROCESSOR, in the names of W. den Hollander, et al, herein incorporated by reference, a television display arrangement that provides flicker reduction is described. In the den Hollander arrangement, an interlaced baseband television input signal having a given field rate is provided. A timing unit, responsive to the video input signal, supplies a vertical synchronizing signal having a pulse waveform that repeats on a four-field basis. The pulses of the pulse waveform cause a corresponding phase modulation of the deflection current such that the durations of corresponding vertical scanning cycles vary on a field basis and repeat on a four field basis.

A conventional vertical deflection circuit may include a sawtooth generator, synchronized to a synchronizing signal having a constant phase that generates a drive signal having a sawtooth waveform. In the generator, a capacitor is discharged, during retrace, by a switch and charged, during trace, by a current source. The drive signal is coupled to a switching circuit that produces a deflection current having a corresponding sawtooth waveform. The drive signal includes a ramping portion that corresponds with vertical trace such that the beginning time of the ramping portion corresponds with a deflection current that causes scanning at the top of the raster of the display.

Because of the phase modulation of the pulse waveform of the vertical synchronizing signal that is required in, for example, the den Hollander, et al. arrangement, the peak amplitude of the drive signal at the end of vertical trace may also change on a field basis in accordance with the pulse waveform pattern.

Different peak amplitudes of the drive signal may cause the beginning time of the ramping portion to be different relative to the corresponding pulse of the vertical synchronizing signal that causes such ramping portion. This is so because the discharge time of the capacitor of the sawtooth generator may vary in accordance with the peak amplitude of the drive signal that may be different in different fields. The result is that the phase of the trace portion of the deflection current may, disadvantageously, vary from that established by the phase modulated vertical synchronizing signal. Consequently, the requirement that even field should overlap even field, odd field should overlay odd field and even and odd field pairs should interlace, disadvantageously, may not be fulfilled.

Therefore, it may be desirable in each deflection cycle to prevent, for example, the beginning time of the ramping portion of the drive signal from being substantially affected by variations in an amplitude, such as the peak amplitude, of the drive signal.

It may also be desirable to generate the drive signal such that a nonlinearity type distortion that is discussed below is corrected by S-shaping of the sawtooth waveform of the drive signal. Nonlinearity distortion may be attributable to the fact that the effective center of deflection of the electron beam is not coincident with the center of radius of curvature of the screen of the kinescope. A common method of compensating for such nonlinearity is to form a deflection current that, rather than being a substantially linear ramp during the recurrent scanning intervals, it becomes a segment of a sinewave having a reduction in the rate of change of deflection current at the positive and negative extremes of the deflection current relative to that at the center. This S-shaping in turn creates a slight reduction in the rate of scanning of the electron beam near the top and bottom edges of the raster relative to the center and a reduction in the stretch nonlinearity.

In some prior art vertical deflection circuits, the S-shaping of the deflection current that corresponds with, for example, the one extreme of vertical trace is done by S-shaping the drive signal that is generated in the sawtooth generator. S-shaping of the deflection current that corresponds with the other extreme of vertical trace is controlled by, for example, a voltage that is developed in a capacitor that capacitively couples the drive signal of the sawtooth generator to a vertical amplifier.

As explained in Den Hollander, et al., it may be desirable to DC-couple the drive signal to the deflection winding. Therefore, the above-mentioned way of S-shaping that utilizes capacitive coupling may not be suitable.

A sawtooth generator, embodying an aspect of the invention, includes a switch responsive to a synchronizing input signal at a frequency that is related to a deflection frequency, such as, for example, a synchronizing signal that is phase modulated. First and second capacitors that are coupled in series form an arrangement that is coupled to a first terminal of the switch. A source of current is coupled to the first terminal for producing a ramping first portion of an output signal of the sawtooth generator when the switch is nonconductive. When the switch is conductive, each capacitor is discharged and clamped to a predetermined level that is unaffected by the modulation of the input signal. The conducting switch produces a ramping second portion of the output signal that changes in opposite direction to that of the first portion. The output signal is coupled to a junction terminal between the first and second capacitors through a first impedance to provide S-shaping of the output signal at one end time of one of the first and second portions of the output signal. The first impedance includes, for example, a third capacitor which is also discharged and clamped to a predetermined value when the switch is conductive. A second impedance is coupled to the junction terminal to provide S-shaping in the other end time of the corresponding portion of the output signal.

In accordance with a further aspect of the invention, a deflection current is generated, in accordance with the output signal, and coupled to a deflection winding. A trace portion of the deflection current is phase modulated in accordance with the control signal. The trace portion is maintained in phase, in each deflection cycle, with the trace portion of the output signal.

In accordance with a yet further aspect of the invention, a television deflection apparatus responsive to a synchronizing input signal at a frequency that is related to a deflection frequency includes a controllable switch responsive to the input signal for operating the switch at a frequency that is related to that of the input signal. First and second capacitors form a series arrangement that is coupled to a terminal of the switch. A source of current is coupled to the capacitors for generating a sawtooth signal at the terminal having a ramping trace portion that changes at a first direction when the switch is in a first state and a ramping second portion that changes at an opposite direction, when the switch is in a second state. An impedance having a first terminal that is coupled to a junction terminal between the first and second capacitors generates a current that is coupled to the junction terminal to control S-shaping of the sawtooth signal. Clamping means coupled to the first and second capacitors clamps each corresponding voltage across each of first and second capacitors to a corresponding predetermined level prior to a beginning time of one of the first and second portions. The sawtooth signal that is S-corrected is used for generating a deflection current in a deflection winding that is S-corrected.

Figure 1:
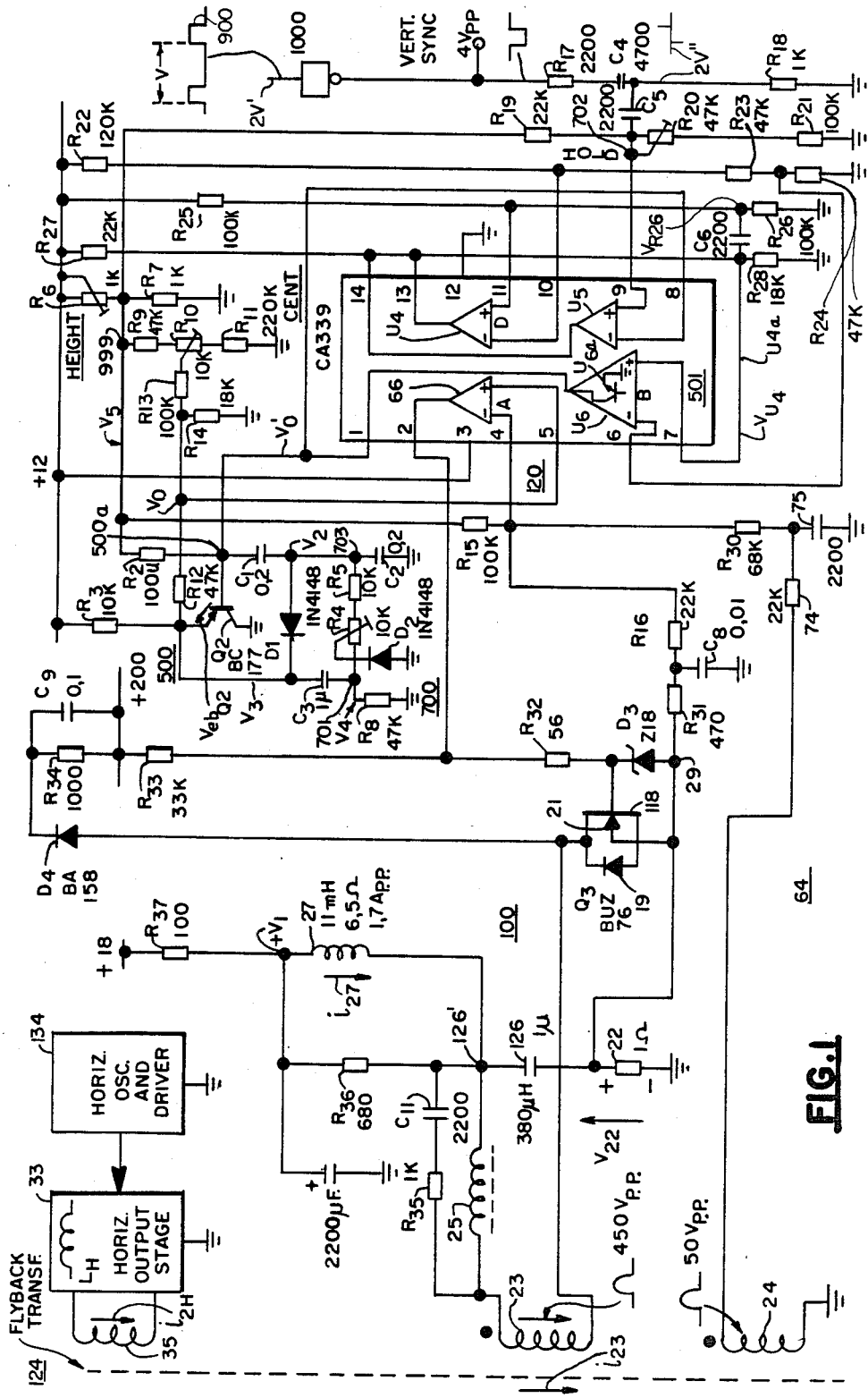
FIG. 1 illustrates a vertical scan generator that includes a sawtooth generator embodying an aspect of the invention.

Referring to FIG. 1, a sync pulse 2V' is coupled to a vertical oscillator circuit 501 of a vertical scan generator 64, embodying an aspect of the invention, that may be used in conjunction with 110° 45AX type picture tube. Pulse 2V' that is phase modulated, is generated in a manner that is described later on. Pulse 2V' has a nominal frequency of $2f_v$, where $f_v$ is the frequency of the vertical sync in a baseband television signal such as of the NTSC or the PAL standard. Pulses 2V' are separated by corresponding intervals of slightly different durations, with the nominal duration being equal to $\frac{1}{2}$V. V represents the vertical scanning interval of 20 milliseconds, in, for example, the PAL standard.

A ramp generator 500 that is controlled by circuit 501 includes a charging current generating resistor R2 that is coupled to a terminal 500a of series coupled capacitors $C_1$ and $C_2$. Resistor R2 charges capacitors $C_1$ and $C_2$ to form a trace portion of a voltage $V_0'$ at terminal 500a. Terminal 500a is driven by an open-collector switching transistor U6a of a comparator U6 for discharging capacitors $C_1$ and $C_2$ to form a vertical retrace portion of voltage $V_0'$. Voltage $V_0'$ is coupled to an inverting input terminal of a comparator U5. A noninverting input terminal of comparator U5 is DC biased by an arrangement that includes a variable hold control resistor R20. Pulse 2V''' that is formed by a differentiating network that includes a capacitor $C_4$ and a resistor R18 is coupled via a capacitor $C_5$ to the noninverting terminal of comparator U5. An output terminal of comparator U5 is coupled to a noninverting input terminal of comparator U6 to form a voltage $V_{U4}$ on a conductor U4a. An inverting input terminal of comparator U6 is DC biased by a voltage across a resistor R24.

During vertical trace, the voltage at the noninverting input terminal of comparator U5 is more positive than the voltage at the corresponding inverting input terminal. Consequently, voltage $V_{U4}$ is more positive than the voltage at the inverting input terminal of comparator U6. Therefore, output transistor U6a of comparator U6 remains nonconductive.

Figure 2:
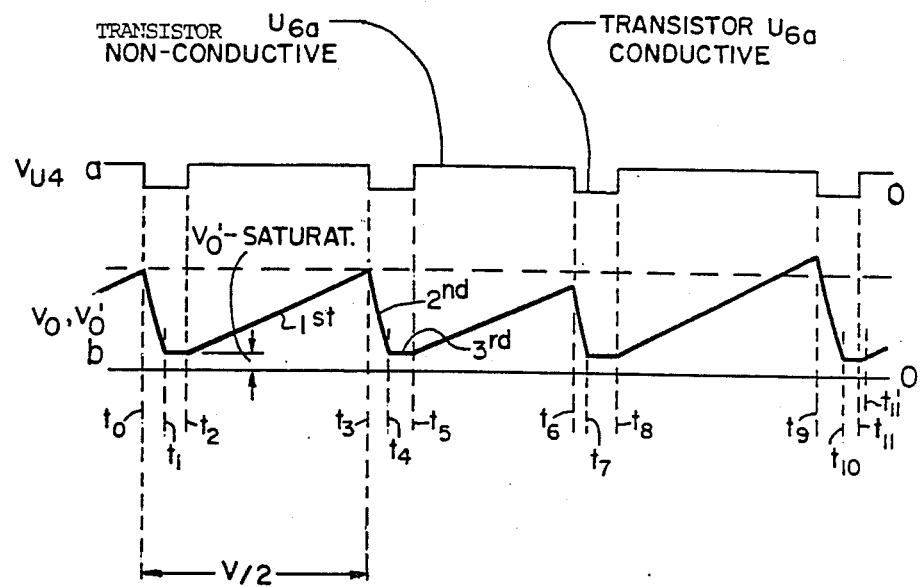
FIGS. 2a and 2b illustrate waveforms useful for explaining the operation of the circuit of FIG. 1.

At the end of trace, when voltage $V_0'$ is at its peak, as illustrated at time $t_0$ in FIG. 2b, a leading edge 900 of pulse 2V' of FIG. 1 occurs. As a result of the differentiation of its leading edge 900, the voltage at the inverting input terminal of comparator U5 becomes smaller than in the corresponding inverting input terminal. The result is that voltage $V_{U4}$ changes to a level that is smaller than that at the inverting input terminal of comparator U6, causing transistor U6a of comparator U6 to become conductive. Conduction of transistor U6a discharges capacitors $C_1$ and $C_2$, causing voltage $V_0'$ to be at the saturation level of transistor U6a that is approximately zero volts.

When, as a result of leading edge 900 of pulse 2V', voltage U4a changes, a time-out capacitor $C_6$ causes a corresponding voltage change at a noninverting input terminal of a comparator U4, operating as a one-shot, to a level that is below that at the inverting input terminal of comparator U4. Consequently, comparator U4 sustains voltage $V_{U4}$ at the low level for a predetermined interval that is determined by capacitor $C_6$ and resistors $R_{22}$ and $R_{23}$. As long as voltage $V_{U4}$ is at the low level, voltage $V_0'$ remains approximately zero, because output transistor U6a of comparator U6 is conductive. Transistor U6a is conductive in intervals that are illustrated schematically in FIG. 2a such as, for example, between times $t_0$ and $t_2$. Thus, the conduction time of transistor U6a is independent of the duration of input pulse 2V'. When voltage $V_{U4}$ of FIG. 1 changes to a high level, the trace portion of voltage $V_0'$ of FIG. 2b, such as, for example, between times $t_2$ and $t_3$ of FIG. 2b, begins. Thus, when leading edge 900 of pulse 2V' occurs, capacitors $C_1$ and $C_2$ of FIG. 1 begin discharging to the saturation voltage level of transistor U6a. In the event that pulses 2V' of FIG. 1 are missing, comparators U4, U5 and U6 that form vertical oscillator 501 produce the required pulses of voltage $V_{U4}$.

Each pulse of voltage $V_{U4}$ of FIG. 1 causes output transistor U6a to clamp voltage $V_0'$ to its saturation voltage level for the predetermined duration of voltage pulse $V_{U4}$ up to time $t_2$ of FIG. 2b, thus preventing voltage $V0'$ from upramping. Voltage $V_0'$ of FIG. 1 is coupled via a transistor Q2, operating as an emitter follower, to produce a voltage $V_0$ of FIG. 2b having a controllable average value that, like voltage $V_0'$, is also of a sawtooth waveform.

An upramping, first, or trace portion of voltage $V_0'$ or $V_0$, occurs during an interval such as interval $t_2$–$t_3$. The first portion begins upramping from a predetermined constant level that is equal to the saturation voltage of output transistor U6a of comparator U6 of FIG. 1 in a way that is not affected by phase modulation of pulse 2V'. Thus, the upramping first portion begins upramping at an instant, such as time $t_2$ of FIG. 2b. A downramping second portion of voltage $V_0$ occurs, for example, during interval $t_0$-$t_1$. A flat third portion occurs during interval $t_1$-$t_2$. The phase modulation of the pulses of voltage $V_{U4}$ of FIG. 1 that are separated by intervals, having correspondingly different lengths, causes correspondingly different peak values of ramp voltage $V_0$ to occur such as at times $t_0$, $t_3$, $t_6$ and $t_9$, respectively, of FIG. 2b.

The sum of the intervals that corresponds with the second and third portions is a predetermined constant that is not affected by the peak value of voltage $V_0$ of FIG. 1. The interval between the beginning of the downramping portion and the beginning time of the upramping portion of voltage $V_0$ such as interval $t_0$-$t_2$ of FIG. 2b may be maintained, illustratively, constant so as to be unaffected by the phase modulation of pulses 2V' of FIG. 1.

Ramp generator 500 includes an S-correction arrangement 700, embodying aspects of the invention. A capacitor $C_3$ of arrangement 700 is coupled between the emitter electrode of emitter follower transistor Q2 and a terminal 701. Terminal 701 is coupled, via a series arrangement of a variable, linearity control resistor R4 and a resistor R5, to a junction terminal 703. Terminal 703 is coupled between capacitors $C_1$ and $C_2$. A diode $D_1$ that, during retrace, clamps voltage $V_2$, at the junction of capacitors $C_1$ and $C_2$, to a predetermined positive level is coupled between terminal 703 and the emitter of transistor Q2. A diode $D_2$ that discharges capacitor $C_3$, during retrace, is coupled in parallel with a resistor R8 and between ground and terminal 701.

Figure 5:
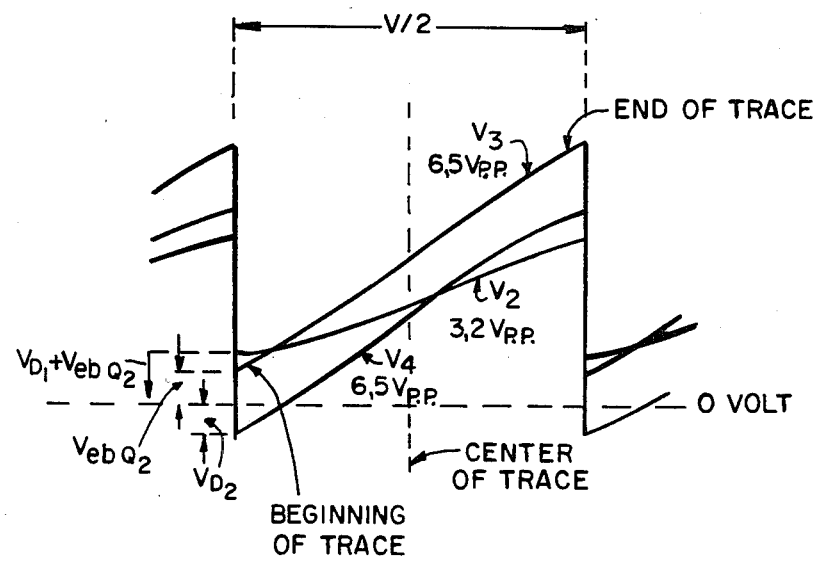
FIG. 5 illustrates waveforms useful for explaining the operation of the arrangement of FIG. 1.

FIG. 5 illustrates waveforms useful in explaining the operation of the circuit of FIG. 1. Similar items and functions in FIGS. 1 and 5 illustrate similar items or functions.

At the beginning of vertical trace, voltage $V_0'$ of FIG. 1 is approximately zero, as described before. A positive voltage $V_2$ at terminal 703 is equal to the sum of saturation voltage $V_0'$, the emitter-base forward voltage of transistor Q2, and the forward voltage of diode $D_1$. Also, voltage $V_4$ at terminal 701 is slightly negative as a result of the clamping operation of diode $D_2$. Because voltage $V_2$ is more positive than voltage $V_4$, capacitor $C_2$ begins discharging through resistors R5 and R4 and through capacitor $C_3$ at a rate of change that initially is, substantially unaffected by the value of resistor R8. Later on, during trace, when an emitter voltage $V_3$ of FIG. 5 of transistor Q2 of FIG. 1 attains a sufficiently high voltage level, capacitor $C_2$ of FIG. 1 is charged through capacitor $C_3$. The initial decrease in voltage $V_2$ causes the rate of change of voltage $V_0'$ to be higher at, for example, the center of trace than at its beginning. As described before, the difference between voltages $V_2$ and $V_4$ causes a partial discharge of capacitor $C_2$, at the beginning of trace. The discharge of capacitor $C_2$ causes a slower rate of increase of voltage $V_3$ of FIG. 5, that is developed at the emitter of transistor Q2 of FIG. 1, than at the center of trace. Thus the slower rate of increase provides S-shaping at a first half of trace that occurs between the beginning and the center of trace, as shown in FIG. 5.

In accordance with an aspect of the invention, during a second half of vertical trace, S-shaping becomes increasingly affected by resistor R8 which increasingly loads capacitor $C_2$ as voltages $V_2$ and $V_4$ increase. Resistor R8 reduces, at the end of trace, the current supplied through capacitor $C_3$ that is available for charging capacitor $C_2$.

Voltage $V_4$ is higher toward the end of trace than, for example, at the center of trace. Therefore, the current that is supplied through capacitor $C_3$ that is bypassed by resistor R8 and that is prevented by resistor R8 from flowing in capacitor $C_2$ becomes increasingly larger toward the end of trace. The result is that voltage $V_3$ is S-corrected at the second half of trace. It follows that an increase, for example, in the value of resistor R8 changes the rate of change of voltage $V_0'$ at the end of trace in an opposite manner to that caused by an increase of, for example, resistor R4.

In accordance with another aspect of the invention, S-corrected ramp generator 500 produces voltage $V_0'$ in which the rate of change, in a given vertical trace, is independent of vertical frequency variations or of the trace time of a preceding vertical trace. Such result is obtained because of the clamping operation of transistor U6a, diode $D_1$ and diode $D_2$ that clamp voltages $V_0$, $V_4$ and $V_2$ during retrace.

FIG. 1, advantageously, also includes a switched vertical deflection circuit 100 of generator 64 that is controlled by a vertical control circuit 120 of generator 64. The operation of deflection circuit 100 and of control circuit 120 is described in detail in U.S. Pat. No. 4,544,864 in the name of P. E. Haferl, entitled SWITCHED VERTICAL DEFLECTION CIRCUIT WITH BIDIRECTIONAL POWER SUPPLY, that is incorporated by reference herein. It should be understood that ramp generator circuit 500 may be employed as the sawtooth generator for other types of DC coupled vertical deflection output stages to obtain proper registration of the displayed image.

Control circuit 120 provides, in accordance with voltage $V_0$, width modulated horizontal, or line rate, switching signals to a switching element 21, illustratively shown as comprising a transistor 118 and an integrated antiparallel diode 19. Transistor 118 may comprise a power field effect transistor. Using such power field effect transistor is particularly advantageous when the horizontal rate is substantially higher than the horizontal frequency in, for example, the PAL standard. High rate horizontal frequency may be used in computer monitors, video display terminals or in television receivers, operating with deflection currents at, for example, twice the horizontal and vertical deflection frequencies, respectively, for reducing the visibility of flicker. Switching element 21 is coupled to a terminal 126 of a storage capacitor 126' via a winding 23 of a flyback transformer 124 that is series coupled with an energy storage coil 25. Terminal 126' of capacitor 126 is coupled to a vertical deflection winding 27. The other terminal of vertical deflection winding 27 is coupled to a voltage supply designated +V1.

A horizontal output stage 33 is switched at the horizontal deflection rate by signals applied from a horizontal oscillator and driver circuit 134. The switching operation of output stage 33 generates a horizontal deflection current $i_{2H}$ at twice the horizontal frequency, $f_H$, of the sync signal of a baseband video signal $V_{BB}$ that is mentioned later on. Output stage 33 produces a retrace voltage at the horizontal rate of $2f_H$ across each winding of flyback transformer 124.

Ramping voltage $V_O$ is fed to a noninverting input terminal of a comparator 66 of FIG. 1 to control the switching operation of switching element 21. Horizontal retrace pulses, applied via a resistor 74, charge a capacitor 75 to obtain a horizontal ramp which is compared with the vertical sawtooth of voltage $V_O$. Comparator 66 serves as a pulse width modulator. An output terminal of comparator 66 that generated pulses at the horizontal rate $2f_H$, having variable duty cycle that vary in a vertical manner, provides gate drive to MOS transistor 18.

The operation of deflection circuit 100 consists of the horizontal rate charge and discharge of storage capacitor 26 which supplies a vertical deflection current $i_{27}$ that flows in winding 27. Horizontal rate switching is performed by switching element 21.

At the beginning of vertical trace, during each horizontal period, transistor 18 of switching element 21 is conductive for a negligible short interval that occurs immediately prior to each horizontal retrace. Consequently, the large retrace pulse in winding 23 is clamped by diode 19 and generates a current $i_{23}$ that is large in winding 23 flowing in a direction opposite to that of the arrow that causes capacitor 126 to be charged to a voltage that is more positive than voltage $+V1$. The resulting voltage at terminal 126 that is more positive than voltage $+V1$ causes negative defelection current $i_{27}$ to flow in winding 27, in a direction opposite to that of the arrow. As a result, deflection current $i_{27}$ charges capacitor $C_{12}$ positively. Control circuit 120 progressively increases, during the vertical scanning trace, the conduction interval of transistor 118 that occurs in each horizontal trace. This causes the negative portion of current $i_{23}$, flowing through diode 19, to decrease progressively and the positive portion of current $i_{23}$, flowing through transistor 118, to increase progressively. As a result, the average voltage across capacitor 126 at terminal 126' decreases and causes, in turn, a decrease of deflection current $i_{27}$.

At the center of vertical trace, equal portions of current $i_{23}$ that are at opposite polarities flow through diode 19 and transistor 118, respectively. Consequently, no charge is added to capacitor 126. Also, the voltage at terminal 126' is equal to voltage $+V1$; therefore, deflection current $i_{27}$, at the center of vertical trace, is zero.

During the second half of the vertical trace, control circuit 120 further increases progressively the conduction time of transistor 118. The sum of the portions of current $i_{23}$ at the opposite polarity, flowing through diode 19 and transistor 118, respectively, increases progressively in the positive direction from zero, causing capacitor 126 to discharge. The voltage at terminal 126 decreases progressively and causes deflection current $i_{27}$ that flows in the direction of the arrow to increase. As a result, deflection current $i_{27}$ discharges capacitor $C_{12}$. At the end of trace, the conduction time of diode 19 is small compared with that of transistor 118. The conduction of diode 19 is controlled by transistor 118 and by energy storage inductor 25 which determines the rate di/dt of current $i_{23}$ that is substantially constant during each horizontal retrace period. It follows that from the beginning to the end of vertical trace deflection current $i_{27}$ changes in an upramping manner and reverses polarity at apprximately the center of vertical trace.

During vertical retrace, transistor, 118 is nonconductive and diode 19 conducts a large amount of negative current $i_{23}$; consequently, deflection winding 27 and capacitor 126 cause a half cycle of oscillation. A resulting vertical retrace voltage charges capacitor 126 to a voltage that is larger than voltage $+V1$ that causes deflection current $i_{27}$ to reverse its polarity.

It can be seen that the current through resistor 122 is equal to the deflection current $i_{27}$. Therefore, the voltage developed across resistor 122 is proportional to current $i_{27}$, the vertical deflection current. The voltage developed across deflection current sampling resistor 122 is produced by deflection current $i_{27}$ and provides negative feedback to vertical control circuit 120. This feedback provides information to vertical control circuit 120 to enable the driving of transistor 18 into conduction for the appropriate duration each horizontal interval to generate vertical deflection current $i_{27}$. Current $i_{27}$, during vertical trace, is linearly proportional to sawtooth ramp voltage $V_O'$ or $V_0$.

When the leading edge 900 of pulse $2V'$ occurs, such as, for example, immediately prior to time $t_0$ of FIG. 2b, the downramping, second portion of voltage $V_0$ begins. The beginning of the downramping portion of voltage $V_0$ causes deflection current $i_{27}$ in winding 27 of FIG. 1 to begin its corresponding downramping retrace portion. When a trailing edge of the pulse of voltage $V_{U4}$ occurs, the upramping trace portion of deflection current $i_{27}$ of FIG. 1 begins. Voltage $V_0$ controls the instantaneous level of deflection current $i_{27}$ during the vertical trace portion of deflection current $i_{27}$.

In each vertical scanning cycle, each of the voltages $V_0$, $V_2$, $V_3$ and $V_4$ is at the same corresponding predetermined voltage level when the trailing edge of the pulse of voltage $V_{U4}$ occurs, because, of the clamping operation, as described before. Consequently, as described later on, proper image registration is obtained. The phase modulation of pulse $2V'$ results in a modulation of the vertical trace time. Capacitors $C_1$, $C_2$ and $C_3$ provide "S" shaping, as described before. The voltage across each of capacitors $C_1$, $C_2$ and $C_3$ requires clamping during pulse $V_{U4}$ to obtain in each such capacitor the corresponding predetermined charge or voltage level at the beginning of each trace interval in a way that is unaffected by the duration of the trace interval of any previous field. Without the clamping action of diodes $D_1$ and $D_2$, each of capacitors $C_1$, $C_2$, and $C_3$ would have carried slightly modulated charge from previous fields which may upset proper image registration. Because of the clamping action in capacitors $C_1$, $C_2$ and $C_3$, the ramping trace portion in each deflection cycle of both voltage $V_0$ and of deflection current $i_{27}$ of FIG. 1 is in phase with, and follows phase variations of the corresponding leading edge 900 of pulse $2V'$.

As described later on, the phase modulation of pulse $2V'$ provides the precise timing that is required to provide a displayed image in which proper image registration occurs such that even fields overlay even fields, odd fields overlay odd fields and such that even and odd field pairs are interlaced.

It should be understood that as a result of the way the waveform of voltage $V_0$ or $V_0'$ of FIG. 2b is generated, the interval from the end of vertical trace of a given deflection cycle of deflection current $i_{27}$ of FIG. 1 to the beginning of vertical trace of the following deflection cycle is also constant.

The DC component of the vertical sawtooth of voltage $V_0$ or $V_0'$ of FIG. 2b should be, preferably, preserved and transmitted to deflection winding 27 of FIG. 1. DC coupling may, preferably, be used between sawtooth generator circuit 500 and vertical deflection circuit 100 as well as to deflection winding 27. DC coupling is preferred so that the phase modulation of pulse $2V'$ does not change the level of deflection current $i_{27}$ that corresponds with a given level of voltage V such as at the beginning of trace.

Height control is provided by a variable resistor R6 that controls, in accordance with a voltage $V_5$, the rate by which capacitors $C_1$ and $C_2$ are charged, during trace. Centering is provided by a variable resistor R10 that is responsive to voltage $V_5$ for controlling the average value of voltage $V_0$. Voltage $V_5$ at a terminal 999 of resistor R2 is proportional to both the sawtooth AC portion of voltage $V_0$ and also to its DC average level. Therefore, voltage $V_5$ forms a DC reference for deflection circuit 100 that maintains picture centering while picture height is being adjusted by varying resistor R6.

Figure 3:
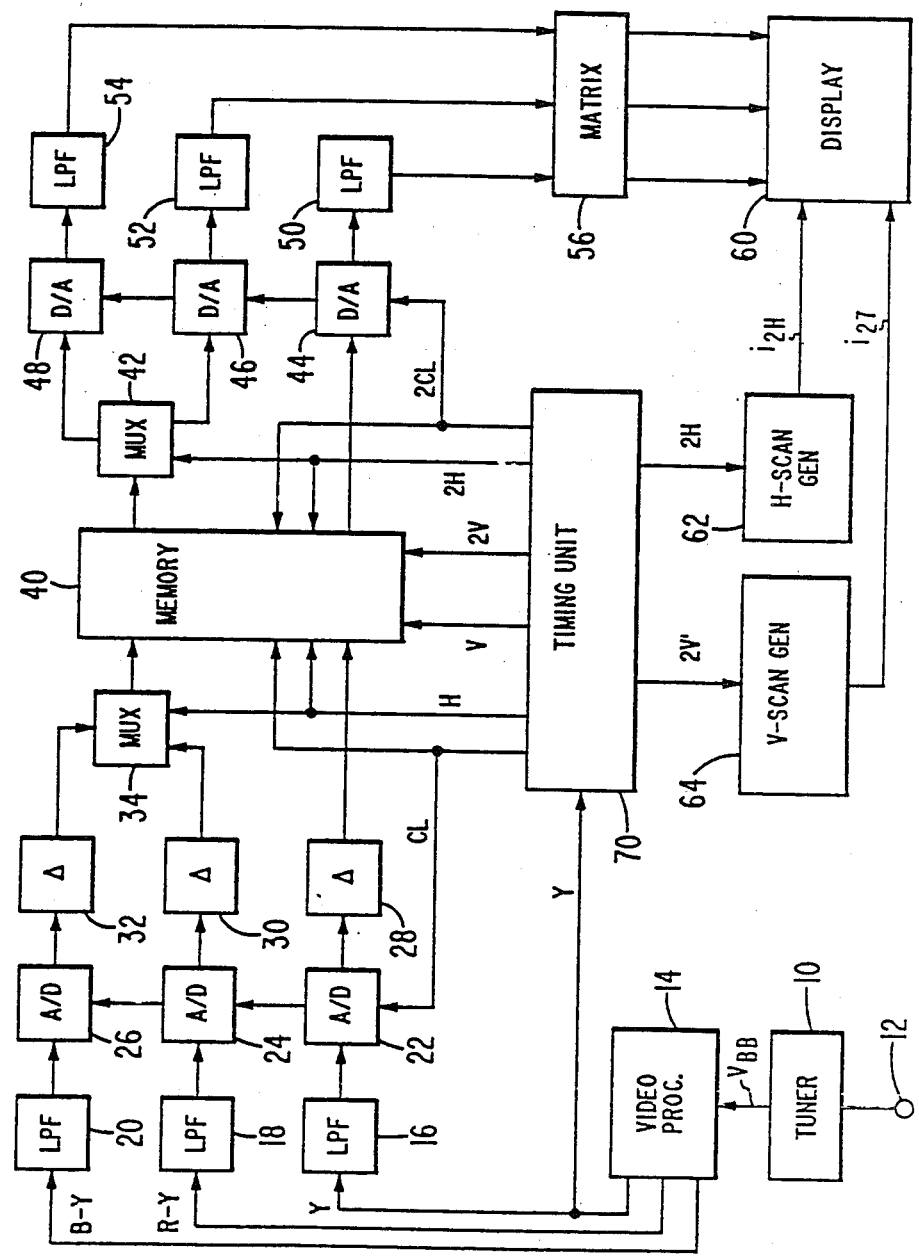
FIG. 3 illustrates a block diagram of a television receiver that includes the generator of FIG. 1.

The features of deflection current $i_{27}$, that were mentioned before, may be useful, for example, in a television receiver circuit of FIG. 3, that is similar to that described in the aforementioned den Hollander application, where the vertical deflection current is phase and amplitude modulated in accordance with a phase modulated vertical sync signal.

The receiver of FIG. 3, that generates pulse 2V' of FIG. 1, includes a tuner 10 of FIG. 3 having an input terminal 12 for connection to an antenna or other source of video input signal and having an output for supplying baseband video output signal VBB that was mentioned before to a video processing unit 14. For purposes of illustration it will be assumed that the baseband video output signal is of the PAL standard. It will be appreciated, however, that the principles of the invention apply also to other standard interlaced video signal formats. Video processor 14 includes a PAL decoder that converts the input signal to Y, R-Y and B-Y component form. The signal could be processed, if desired, in R, G, B component form but R, G, B components each have full video bandwidth while the color difference signals (R-Y, B-Y) have a lower bandwidth. Accordingly, a field store for color difference signals can be realized with fewer memory elements than would be the case if processing were done using R, G, B components.

The Y, R-Y and B-Y component signal are low pass filtered by filters 16, 18 and 20 and converted to digital form by analog-to-digital (A/D) converters 22, 24 and 26 for storage in a memory 40. Filters 16–20 minimize aliasing and have cutoff frequencies of 7.5 MHz for Y and 2.8 MHz for the color difference signals R-Y and B-Y for the assumed PAL input signal. Lower cut off frequencies would be appropriate for NTSC standard signals.

Converters 22–26 digitize the low pass filtered components to an 8-bit resolution using a sample clock CL that is phase locked to a multiple of horizontal sync in order to obtain a constant number of samples per horizontal line. After A/D conversion the digitized components are applied to memory 40 via respective delay units 28, 30 and 32. The delay units may be variable and are included to equalize the delay times of the three input signal paths. The color difference components R-Y and B-Y are applied to memory 40 via a multiplex switch (MUX) 34 controlled by a horizontal line rate signal H. Switch 34 combines the two 8-bit wide color differences into a single 8-bit wide signal to minimizing storage requirements in memory 40.

As one field of the multiplexed 8-bit signal and the 8-bit luma signal are stored in memory 40, a field previously stored is read out twice using a read clock signal 2 CL of double the write clock CL frequency. This doubles the field rate (100 Hz for PAL, 120 Hz for NTSC) and so reduces the perception of flicker where the signal is displayed on display unit 60. A multiplex switch 42 demultiplexes the color difference signals which, with the double field rate luma signal, are converted back to analog form by digital to analog converters 44–48. Low pass filters 50–54 suppress the repeat spectra after D/A conversion, suitable cut-off frequencies being 13.5 MHz for luma and 6.75 MHz for chroma. The double field rate analog signals are then converted to R G B form for application display 60 which is synchronized by means of double speed horizontal deflection current $i_{2H}$ and vertical deflection current $i_{27}$ provided by generators 62 and 64, respectively. Generator 62 generates deflection current $i_{2H}$ at twice the frequency $f_H$ of the horizontal sync of baseband video output signal $V_{BB}$.

A field consists of 312.5 lines in the PAL standard. At double speed read out this field together with its repetition must consist of 625 lines. This can be realized when one of the two fields consists of 312 lines and the other consists of 313 lines. Memory 40 of FIG. 3 is supplied with timing signals from unit 70 to provide the field sequence shown in FIG. 4A in which 312 lines are produced in the first read cycle (fields A or B) and 313 lines are produced during the second memory read cycle (field A' or B') with the 313th line being blank.

Figure 4:
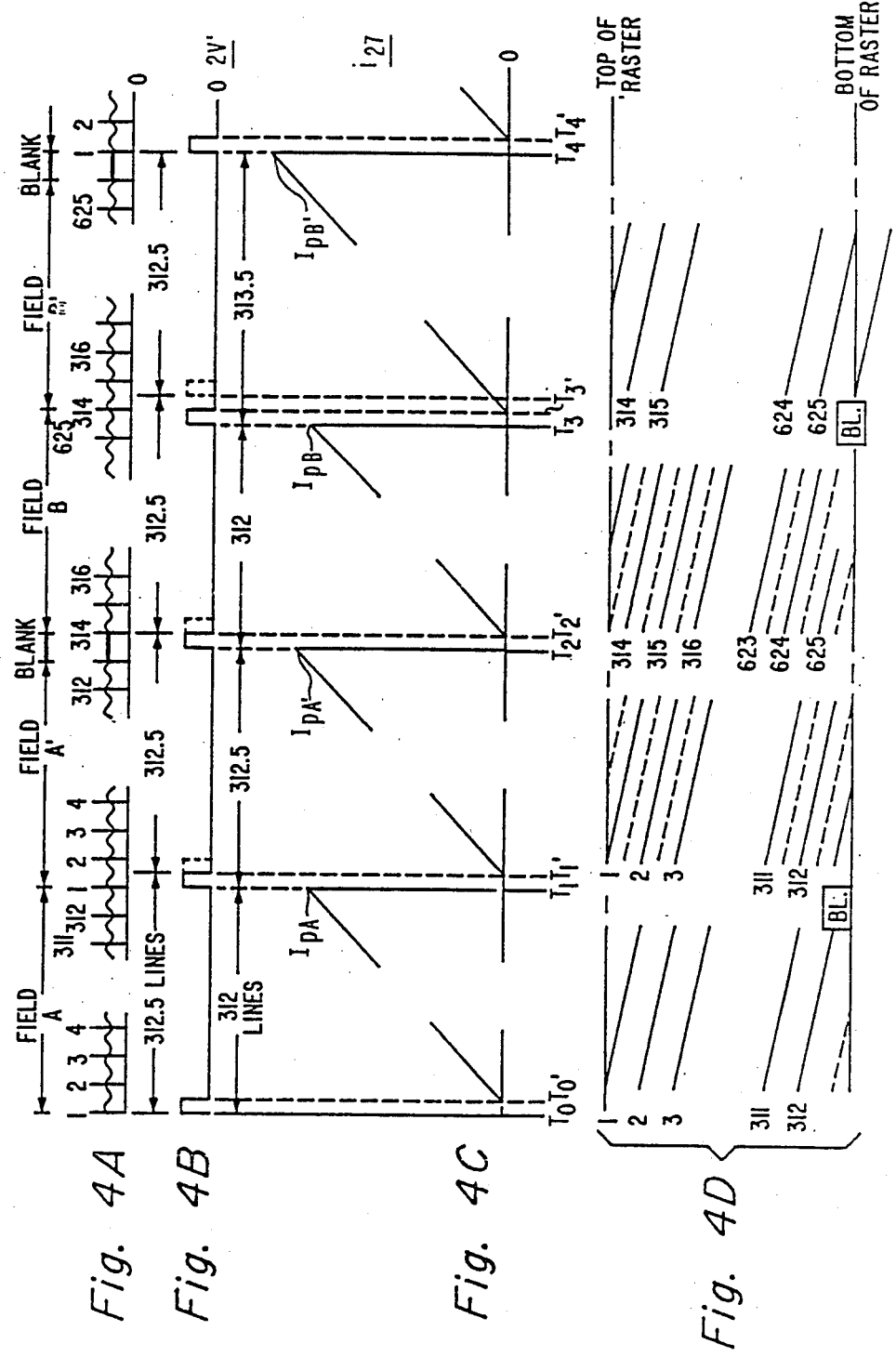
FIGS. 4A-4D are waveform diagrams illustrating the operation of the receiver that utilizes the generator of FIG. 1.

The double field rate vertical sync pulse 2V' required for generator 64 has the pulse pattern illustrated in solid line in FIG. 4B. For comparison purposes, pulses in dashed-line are provided, which represent a situation of equidistant double rate vertical sync pulses having a period of 312.5 line. The solid line pulses represent pulse signal 2V' of FIGS. 2 and 3, which is periodic on a four-field basis. As shown, there are 312 lines in field A, 312.5 lines in the repeat field A', 312 lines in field B and 313.5 lines in repeat field B'. Pulse 2V' controls vertical deflection generator 100, as described before, to produce the vertical scan waveforms of vertical deflection current $i_{27}$. The vertical trace portions of current $i_{27}$ are shown schematically in FIG. 4C. The scanning current waveform sequence of FIG. 4c results in the interlace pattern shown in FIG. 4D in which the first fields (A, A') overlay first fields, the second fields overlay second fields (B, B') and in which the first and second field pairs (AA', BB') are interlaced. For purpose of comparison, the dashed lines in FIG. 4D illustrate scan lines which would result if sync pulses 2V' of FIG. 4B were equidistant rather than being shifted or phase modulated. To ensure proper registration of displayed fields, the sawtooth voltage of FIG. 4C provided by generator circuit 500, that was described before, always starts at the same value and all retrace times (T0–T0', T1–T1', T2–T2', etc.) are equal.

Timing signals for controlling the digital converters, memory, switches and scan generators are provided by timing unit 70 of FIG. 3. Unit 70 generates, as described in den Hollander, two-field and four-field pulse sequences for memory control and for scan generation of pulse 2V' for ensuring that even fields overlay even fields, odd fields overlay odd fields, and that even and odd pairs of fields are interlaced when the double field rate signal is displayed.

The irregularly spaced double field rate vertical sync pulses 2V', absent the operation of ramp generator circuit 500 and of circuit 501 of FIG. 1, embodying aspects of the invention, may, disadvantageously, produce a variation in the phase of the trace portion of deflection current $i_{27}$ relative to the corresponding pulse 2V' over the four field sequence.

What is claimed:

1. A television deflection apparatus responsive to a synchronizing input signal at a frequency that is related to a deflection frequency, comprising:

a controllable switch responsive to said input signal that operates at a frequency that is related to that of said input signal;

first and second capacitors forming a series arrangement that is coupled to said switch;

a current source coupled to said capacitors for charging said capacitors to generate a sawtooth signal having a ramping first portion that changes at a first direction when said switch is nonconductive such that when said switch becomes conductive said switch discharges said capacitors to form a ramping second portion of said sawtooth signal that changes at an opposite direction;

a source of a ramping voltage;

a first impedance coupled to said source of said ramping voltage and to a junction terminal that is coupled between said first and second capacitors for generating a first current that flows in said first impedance that controls S-shaping of said sawtooth signal by reducing the rate of change of said sawtooth signal at a first end time of one of said first and second portions of said sawtooth signal in accordance with said first current that flows in said first impedance;

a second impedance coupled to a terminal of said first impedance that is remote from said first junction terminal for bypassing a portion of a current that flows in a current path between said source of said ramping voltage and said junction terminal for reducing said first current in said first impedance and that reduces the rate of change of said sawtooth signal at an opposite end time of said one of said first and second portions of said sawtooth signal to control S-shaping at said opposite end time;

a deflection winding; and means responsive to said sawtooth signal for generating a deflection current in said deflection winding that is S-corrected.

2. An apparatus according to claim 1 further comprising a third capacitor for capacitively coupling said ramping voltage to said junction terminal.

3. An apparatus according to claim 2 wherein said source of ramping voltage comprises a voltage follower having an input terminal that is responsive to said sawtooth signal and wherein said third capacitor is coupled between an output terminal of said voltage follower and a terminal of said first impedance that is remote from said junction terminal.

4. An apparatus according to claim 3 further comprising, means coupled to said third capacitor for clamping a voltage developed in said third capacitor, causing it to be at a level that is the same at a beginning time of each trace interval of said deflection current.

5. An apparatus according to claim 2 wherein said first and second impedances comprise corresponding first and second resistors, wherein said third capacitor and said first resistor form a current path for discharging said second capacitor at said first end time of said portion that corresponds with a trace interval of said deflection current and for charging said second capacitor at said opposite end time of said portion that corresponds with said trace interval such that, at said opposite end time, said second impedance reduces a rate by which said second capacitor is charged.

6. An apparatus according to claim 5 wherein said first resistor is variable for adjusting a linearity distortion.

7. An apparatus according to claim 2 further comprising, means responsive to said input signal for phase modulating said sawtooth signal and voltage clamping means coupled to said first, second and third capacitors for clamping, at said first end time that corresponds with a beginning time of a trace interval, the corresponding voltages across each of said first, second and third capacitors to corresponding predetermined first, second and third levels that are, each, unaffected by the phase modulation of said sawtooth signal.

8. An apparatus according to claim 7 wherein said voltage clamping means comprises a first diode coupled between said second capacitor and said source of ramping voltage for clamping the voltage in said second capacitor to be at said second level prior to a beginning time of said trace interval and a second diode that is coupled to said third capacitor for clamping the voltage in said third capacitor to be at said third level prior to said beginning time of said trace interval and wherein said controllable switch clamps the voltage in said first capacitor to be at said first level prior to said beginning time of said trace interval.

9. An apparatus according to claim 1 further comprising clamping means coupled to said first and second capacitors for clamping each corresponding voltage across each of said first and second capacitors to a corresponding predetermined level at a beginning time of each trace interval of said deflection current that is substantially unaffected by an amplitude of said sawtooth signal.

10. A television deflection apparatus responsive to a synchronizing input signal at a frequency that is related to a deflection frequency, comprising:

a controllable switch responsive to said input signal for operating said switch at a frequency that is related to that of said input signal;

first and second capacitors forming a series arrangement that is coupled to a terminal of said switch;

a source of DC voltage coupled through a first resistor to said capacitors for generating a sawtooth signal at said terminal having a ramping trace portion that changes at a first direction when said switch is nonconductive and a ramping retrace portion that changes at an opposite direction, when said switch is conductive;

an impedance having a first terminal that is coupled to a junction terminal of said first and second capacitors for generating a first current that is coupled to said junction terminal to control S-shaping of said sawtooth signal;

means coupled to said first and second capacitors for clamping each corresponding voltage across each of said first and second capacitors, causing each to be at a corresponding predetermined level prior to a beginning time of said trace portion such that each of said corresponding predetermined levels across each of said capacitors is substantially unaffected by an amplitude of said sawtooth signal at an end time of said trace portion;

a deflection winding; and means responsive to said sawtooth signal that is S-corrected for generating a deflection current in said deflection winding that is S-corrected.

11. An apparatus according to claim 10 wherein said impedance includes a third capacitor and wherein said clamping means is coupled to said third capacitor for clamping a voltage across said third capacitor, causing it to be at corresponding predetermined level prior to said beginning time of said trace portion.

12. An apparatus according to claim 10 wherein said clamping means comprises a diode.

13. An apparatus according to claim 10 wherein said sawtooth signal is at a vertical deflection frequency.

14. A television deflection apparatus according to claim 10 further comprising, means responsive to said input signal for generating a control signal at a frequency that is related to said frequency of said input signal and at a phase that is modulated, wherein said controllable switch is responsive to said control signal for generating said sawtooth signal that is synchronized by said control signal, such that in each deflection cycle, when said sawtooth signal begins ramping in said first direction that occurs at said beginning time of said trace portion of said sawtooth signal, said sawtooth signal is at a predetermined level that is unaffected by the modulation of said phase of said control signal.

15. An apparatus according to claim 14 wherein said sawtooth signal has an amplitude that varies in accordance with the modulation of said phase of said control signal.

16. An apparatus according to claim 15 wherein said predetermined level of said sawtooth signal at said beginning time of said trace portion is the same in each deflection cycle so as to prevent a variation of said amplitude of said sawtooth signal that is caused by the modulation of said phase of said control signal from varying the phase of a trace portion of said deflection current relative to the phase of said control signal.

17. An apparatus according to claim 14 wherein said sawtooth signal has a third portion that occurs between said trace and retrace portions, such that an interval that is equal to the sum of said retrace and third portions that separates said trace portion of a given deflection cycle from said trace portion of the following one has a duration that is the same in each deflection cycle.

18. An apparatus according to claim 17 wherein the length of said interval that is equal to the sum of said retrace and third portions is unaffected by the modulation of said phase of said control signal.

19. An apparatus according to claim 11 wherein said control signal causes said switch to be conductive throughout an interval having the same length in each deflection cycle.

20. An apparatus according to claim 11 wherein said control signal generating means causes said switch to be conductive at least until after said first, second and third capacitors are clamped to corresponding predetermined constant levels that are, each, unaffected by an amplitude of said sawtooth signal.

21. An apparatus according to claim 11 wherein said control signal is at a nominal frequency that is equal to a vertical rate, and wherein said deflection current generating means comprises a switched vertical deflection circuit that is responsive to a signal at a frequency that is related to a horizontal rate and that generates said deflection current at said vertical rate.

22. An apparatus according to claim 11 wherein said third capacitor has a second terminal that is DC coupled to said sawtooth signal.

23. An apparatus according to claim 11 wherein said first terminal of said third capacitor is coupled to said junction terminal via a second resistor and wherein a third resistor is coupled to a second junction terminal between said third capacitor and said second resistor for bypassing a portion of a current that flows in said third capacitor.

24. An apparatus according to claim 1 wherein one of said first and second capacitors is DC-coupled to said deflection winding.

25. A television deflection apparatus responsive to a synchronizing input signal at a frequency that is related to a deflection frequency, comprising:
a source of said synchronizing input signal;
first and second capacitors forming a series arrangement;
a source of a first current coupled to said capacitors for charging said capacitors to generate a sawtooth signal having a ramping trace portion that changes at a first direction during trace and a ramping retrace portion of said sawtooth signal that changes at an opposite direction during retrace;
a source of a first voltage at a frequency that is related to that of said input signal;
a first impedance coupled between said source of said first voltage and a junction terminal of said first and second capacitors for generating a second current that is coupled to said junction terminal that provides S-correction to said sawtooth signal;
switching means coupled to said first and second capacitors for establishing prior to a beginning time of said trace portion of said sawtooth signal, respective voltages that are developed across the two capacitors at corresponding levels that are substantially unaffected by an amplitude of said sawtooth signal;
a deflection winding; and
means responsive to said sawtooth signal that is S-corrected for generating a deflection current in said deflection winding that is S-corrected.

26. An apparatus according to claim 25 wherein said deflection winding is DC-coupled to one of said first and second capacitors.

27. An apparatus according to claim 25 wherein said source of said first voltage generates said first voltage having a sawtooth waveform.

28. An apparatus according to claim 25 wherein said source of said first voltage is responsive to said sawtooth signal for generating, in accordance therewith, said first voltage.

29. An apparatus according to claim 25 wherein said first impedance comprises a second series arrangement of a third capacitor and a first resistor and wherein said switching means is coupled to said third capacitor for establishing a voltage thereacross prior to said beginning time of said trace portion to be at a corresponding level that is substantially unaffected by said amplitude of said sawtooth signal.

30. An apparatus according to claim 29 further comprising, a second impedance coupled to said third capacitor for bypassing a portion of a current that flows in said third capacitor for reducing said second current such that by reducing said second current a rate of change of said sawtooth signal at an end time of said trace portion becomes smaller.

31. An apparatus according to claim 25 wherein said switching means comprises a controllable switch responsive to said input signal and coupled to a terminal of one of said first and second capacitors where said sawtooth signal is generated for establishing the voltage across one of said first and second capacitors to be at said corresponding level that is substantially unaffected by said amplitude of said sawtooth signal prior to said beginning time of said trace portion and a diode coupled between said junction terminal and a voltage that varies in accordance with said sawtooth signal for establishing the voltage across the other one of said first and second capacitors to be at said corresponding level that is substantially unaffected by said amplitude of said sawtooth signal prior to said beginning time of said trace portion.

32. An apparatus according to claim 25 wherein said source of synchronizing input signal is responsive to a baseband television signal for generating said synchronizing input signal that is phase modulated and having a nominal rate that is related to that of a vertical sync signal component of said television signal and a second synchronizing input signal having a rate that is higher than that of a horizontal sync signal component of said television signal, said apparatus further comprising means responsive to said second synchronizing input signal for generating a second deflection current in a second deflection winding at a rate that is higher than that of a horizontal sync signal of said television signal such that said higher rate of said second deflection currents reduces flicker in an image that contains picture information of said television signal.

33. An apparatus according to claim 32 wherein said first synchronizing input signal that is phase modulated is repetitive on a four-field basis.

34. An apparatus according to claim 32 wherein said switching means prevents the phase modulation of said first synchronizing input signal from substantially affecting said sawtooth at said beginning time of trace.

* * * * *